(12) United States Patent  (10) Patent No.: US 8,931,044 B1
Subramanian                (45) Date of Patent:    Jan. 6, 2015

(54) METHODS AND SYSTEMS FOR AUTOMATED ASSIGNMENT OF PROTECTION TO PHYSICAL DOCUMENTS THAT ARE DIGITIZED

(75) Inventor: Lalith G. Subramanian, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 23 days.

(21) Appl. No.: 13/538,047

(22) Filed: Jun. 29, 2012

(51) Int. Cl.
*G06F 21/00* (2013.01)

(52) U.S. Cl.
USPC .................. 726/1; 726/26; 726/28; 382/100; 382/128; 707/748; 707/802

(58) Field of Classification Search
USPC ........................................ 726/1, 26; 382/128
See application file for complete search history.

(56) References Cited

U.S. PATENT DOCUMENTS

| | | | |
|---|---|---|---|
| 7,987,494 B1* | 7/2011 | Donahue | 726/1 |
| 2008/0047020 A1* | 2/2008 | Masui | 726/26 |
| 2008/0098455 A1* | 4/2008 | Hirahara | 726/1 |
| 2009/0147988 A1* | 6/2009 | Jones et al. | 382/100 |
| 2010/0284579 A1* | 11/2010 | Kobayashi | 382/128 |
| 2011/0258200 A1* | 10/2011 | Drummond | 707/748 |
| 2011/0277037 A1* | 11/2011 | Burke et al. | 726/26 |

* cited by examiner

*Primary Examiner* — Jason Lee
(74) *Attorney, Agent, or Firm* — Dergosits & Noah LLP; Todd A. Noah (57) ABSTRACT

Content analysis is performed on documents that have been scanned or converted into a digital format. Based on the content analysis of a document, a security policy is selected and assigned or attached to the document. The security policy prevents the document from being improperly accessed. In a specific implementation, the documents include patient medical records.

15 Claims, 7 Drawing Sheets

Dignity Health                                905
Imaging Services                    910 —Name:              Bill Smith
St. John's Medical Center                MR #:              8765309
750 Paxson St.                           Patient Location:  SJMC XR
San Francisco, CA 94117                  Sex  D.O.B.:       M 11/27/1965
Dept Phone: (415) 555-5770               Billing Number:    741014357

Magnetic Resonance Imaging                    ⎯ 915
Exam Date/Time:         Procedure:       Accession Number:   Ordering Physician:
05/10/11 09:12          MR Ab wo+w con   07-MR-12-005955     Jack Ryan, MD Reason for Exam:
LIVER HEMANGIOMA 153.9

Report
INDICATION: Liver hemangioma 153.9. The patient reports a history of colon cancer November 2001

TECHNIQUE: Multiplanar unenhanced and IV contrast enhanced T1 and T2-weighted images of the liver.

IV contrast: 20 cc gadolinium

COMPARISON: CT abdomen May 7, 2012 and MR abdomen October 30, 2007 from SJMMC. No prior outside studies or outside reports are immediately available for direct review at this time.

FINDINGS: In the lateral segment of the left hepatic lobe is a mass with arterial phase enhancement, measuring 2.0 x 1.9 x 1.5 cm matching the CT appearance of May 7, 2012. In the setting of colon carcinoma, this new mass would be worrisome for liver metastases. The 5mm nodule reported at the right hepatic dome as seen on the CT of May 7, 2012, is not definitely appreciable on today's MR although it may be below the threshold resolution for MR. No other definite hepatic lesions are identified.

This study is not tailored to evaluate the other organs of the abdomen. However, the visualized portions of the spleen, pancreas, gallbladder, adrenals, and kidneys are grossly unremarkable. The abdominal aorta and IVC are grossly unremarkable on these images. No appreciable intraperitoneal free fluid.

IMPRESSION:
1. Enhancing mass lateral segment left hepatic lobe, measuring 2.0 x 1.9 x 1.5 cm matching the CT findings of May 7, 2012. This mass exhibits arterial phase enhancement. It does not meet MR criteria for an hepatic hemangioma. In the setting of a known malignancy such as colon carcinoma, a liver metastasis would be favored. An alternative diagnosis for this new lesion could be a new hepatocellular carcinoma.

2. No other definite hepatic lesions are identified on these images.

3. These findings were communicated by telephone by me to the ordering physician Dr. Jack Ryan at the time of image interpretation May 14, 2012, 4 p.m.

****FINAL****** ⎯ 915
Dictated by: David Lee, MD
Electronically signed by: David Lee
Transcribed by: RDW, D: 5/14/2012 13:23, T: 05/14/2012 20:16, S: 05/14/2012 20:16

Page 1 of 1

METHODS AND SYSTEMS FOR AUTOMATED ASSIGNMENT OF PROTECTION TO PHYSICAL DOCUMENTS THAT ARE DIGITIZED

BACKGROUND

The present invention relates to the field of information technology, including, more particularly, to systems and techniques for securing documents.

Many important documents exist on paper and within physical file systems. For example, there are document warehouses where millions upon millions of pieces of paper are kept. It can be very difficult and time-consuming to search and retrieve such physical documents. Some examples of documents that may be stored in a physical warehouse include patient medical records, financial records (e.g., home mortgage applications, annual reports, securities and exchange (SEC) filings), insurance claims, product manuals, research papers, drawings (e.g., technical drawings, architectural drawings, engineering drawings, or manufacturing drawings), and others.

There is a desire to convert paper-based documents into digital formats. Information that is in a digital format can be more easily and efficiently searched, moved, and shared. It cuts both ways. Information in a digital format can also be subject to more improper access including improper viewing, distribution, and copying. Existing techniques rely on penalties (e.g., civil penalties or criminal penalties) to regulate a person's behavior. For example, the Health Insurance Portability and Accountability Act (HIPA) provides punishment for improperly accessing a patient's medical records. However, this is insufficient because a person willing to risk punishment may still access the document. Manual review of the documents to determine the security policy to assign can be a very expensive and time-consuming process.

Thus, there is a need to provide systems and techniques to automate the assignment of protection to documents.

BRIEF DESCRIPTION OF THE FIGURES

FIG. 9 shows an example of a digitized document or medical record.

DETAILED DESCRIPTION

Figure 1:
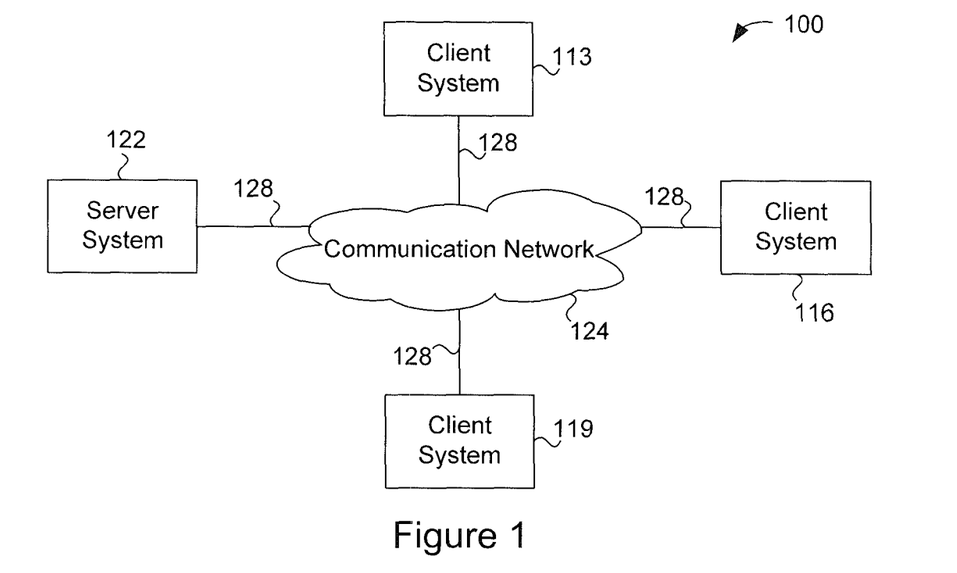
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
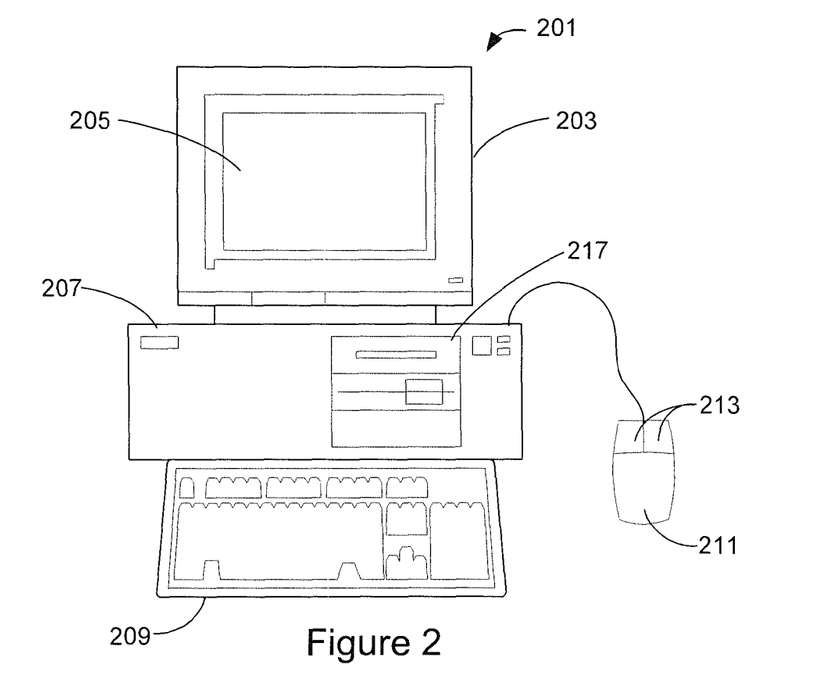
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
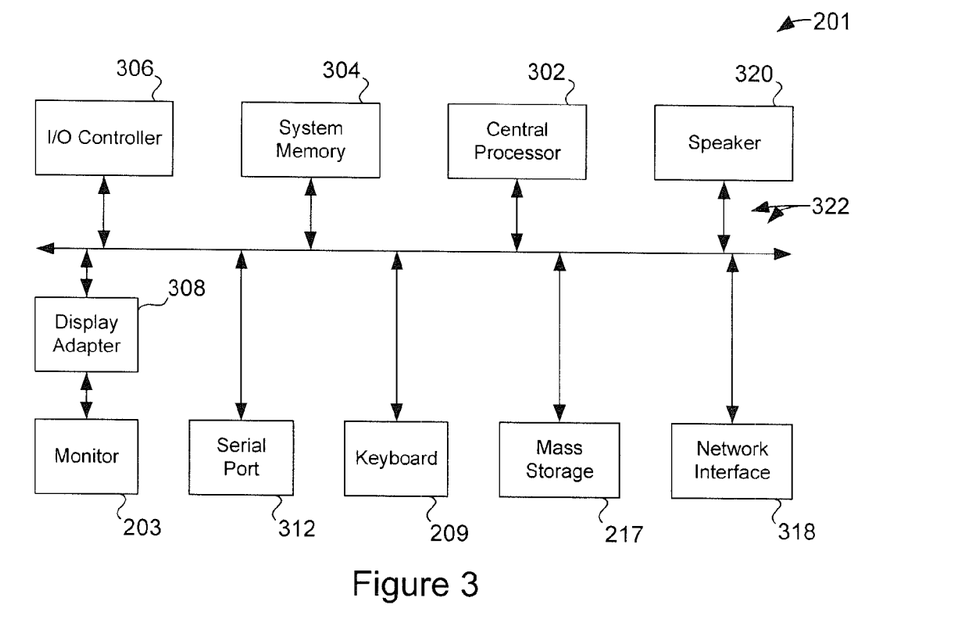
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
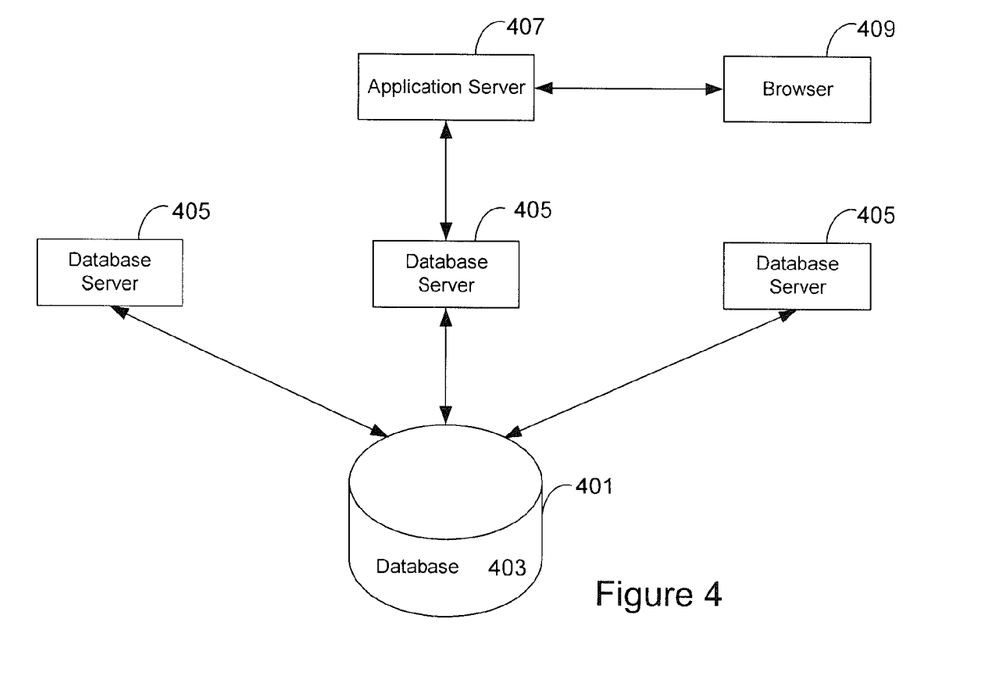
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network.

The application server may also be a virtual database server or a virtual directory server. The application server may provide user-friendly mechanisms and interfaces for accessing the database through the database servers. In an implementation, a web browser 409 is utilized to access the application server.

Figure 5:
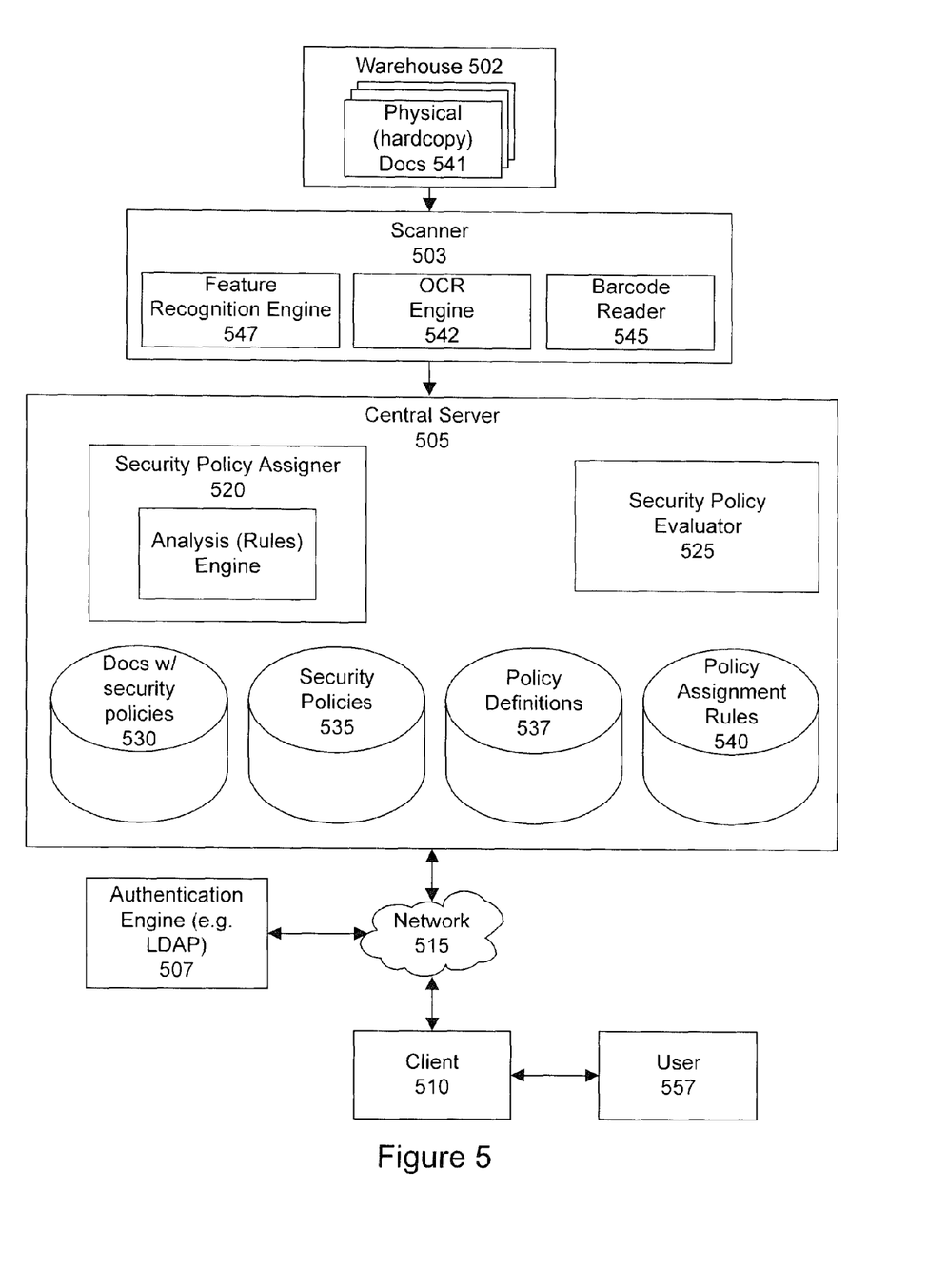
FIG. 5 shows a block diagram of a system for automatically assigning protection to digitized documents.

FIG. 5 shows a simplified block diagram of an environment having a system for automatically assigning protection to physical documents have been scanned or digitized. That is, security policies may be assigned without user intervention or without a user having to manually review the document in order to decide what security policy to assign. As shown in FIG. 5, there is a warehouse 502, a scanner 503, a central server 505, and an identity authentication engine 507. One or more clients such as a client 510 can access the central server over a network 515.

The central server includes a security policy assigner 520, a security policy evaluator 525, and storage including a database 530 for storing scanned documents, a database 535 for storing security policies, a database 537 for storing security policy definitions, and a database 540 for storing policy assignment rules.

The warehouse stores documents in hardcopy form (e.g., physical paper-based documents 541). The documents may be labeled or associated with a barcode for tracking. In a specific embodiment, the documents include patient medical records such as prescriptions, invoices, billing statements, physician notes, physician reports, physician orders, preauthorization forms, authorization confirmations, charts, pathology results, radiology results, images (e.g., computed tomography (CT), magnetic resonance imaging (MRI), or positron emission tomography (PET)), film, case studies, lab results, patient-signed release statements, patient-signed financial responsibility statements, patient registration forms, transcriptions, letters, correspondence, or advance health care directives—just to name a few examples. It should be appreciated, however, that aspects of the invention may be applied to other types of documents such as financial documents (e.g., mortgage applications), benefit enrollment forms, insurance claims, and many others.

As we move into a predominantly digital world, there is very often a need to blend it with the reality that many relevant and critical documents exist on paper. However due to their nature, it is desirable for them to be secured as robustly or more robustly in digital form as what was possible in their physical form. This patent application describes systems and techniques to efficiently secure various types of documents when scanned or digitized in cases where it may be difficult to know what the security requirement is for them. Examples of these documents may be miscellaneous patient-related medical forms that exist in a folder in a warehouse or home mortgage applications that were filled out on paper a decade ago and are secured in a records warehouse.

Some of the different document types that the system can analyze include free-form text, semi-structured documents, and structured documents. Free-form text can include handwritten documents. Semi-structured documents include documents that have structure but can contain free-form text for elements, e.g., insurance claim forms in which the fields are known but descriptions are in text. Structured documents include documents in which elemental values can be validated against a structure e.g., forms with multiple-choice or binary answers.

In a specific embodiment, documents consisting of entirely (or mostly) free-form text are converted or partially reduced to be one of the others by, for example, text recognition. In a specific embodiment, digitized documents are stored in a repository in which access restrictions can be placed at a document level. Structured and semi-structured documents are interpreted as a set of elements and values e.g., fields on a form and entries for the fields.

In a specific embodiment, security policies are defined and stored in a policy database. For example, such a policy might semantically mean, "define the security such that access be granted only to the person who signed the document." In this specific embodiment, the policy to be applied is determined by the evaluation of expressions based on the fields that are expected to be present in the paper documents. In the example, the person who signed the document is identified by evaluating "the text present in the name field" or "where the value in the name field and the address identifies a unique person in a name directory." Two or more people can have the same name. Using two or more different pieces of information to identify someone such as their name and address (or name and birthday) helps to ensure that the correct person is identified to be given access.

In this specific embodiment, once the desired or right policy is identified by matching against these expressions, permissions can be set in the repository to restrict access to the digitized content. The ability to recognize information in the documents and match them against a set of policies in a database by evaluating rules based on this information can significantly improve the efficiency of digitization of content which are sensitive.

Aspects of the invention can be applied to manufacturing and other drawings, X-ray and other medical imaging on film, and so forth. These typically also have textual information to guide policy rules (e.g., the title block in a CAD drawing) or visual information that, similar to OCR, can be recognized by identification of features in the image. X-rays, for instance, could be subject to both, e.g., "if you recognize the name of the patient as a famous actor or you recognize a feature that shows a bullet."

Scanner 503 is responsible for converting the hardcopy documents into digital images or into a digitized document form (e.g., scanned document). A digitized document or document image may be in a portable document format (PDF) file format, a TIFF file format, a JPEG file format, or in any other electronic format that is viewable on an electronic screen. In a specific embodiment, the document is read-only. In another specific embodiment, the document can be edited.

In a specific embodiment, the scanner includes an optical character recognition (OCR) engine 542, a barcode reader 545, and a feature recognition engine 547. The OCR engine converts scanned images of handwritten, typewritten, printed text, or combinations of these into machine-encoded text or characters. The OCR engine may identify whether the text was printed or typewritten or whether the text was handwritten. Text that was printed or typewritten may indicate that the text is a form field. Text that was handwritten may indicate that the text is an entry for the form field.

The barcode reader reads and decodes a barcode that may be included with the hardcopy document. The decoded barcode may be cross referenced with a database in order to retrieve additional information that may be associated with the barcode. The additional information may include, for example, patient demographic information, name, date of birth, address, mother's maiden name, social security number, patient allergies, and so forth.

The feature recognition engine is responsible for identifying or recognizing a visual feature from the scanned document. A visual feature may include text (e.g., words, letters, numbers, field names, field entries or values), characters, symbols (e.g., punctuation mark, period, dash, or colon), an image (e.g., picture, photograph, or a medical image), an abnormality or anomaly in a medical image, a foreign object in a medical image (e.g., a bullet present in an x-ray), a human body part (e.g., an organ) in a medical image, or combinations of these. The feature recognition engine may reference classification table or taxonomy in order to classify the scanned document. The classification table may include a predefined list of features and a corresponding list of classifications. For example, a first feature may be "bullet present in an x-ray" and a corresponding classification for the scanned document may be "sensitive" so that special precautions can be undertaken for documents related to gunshot wounds.

The central server receives as input from the document scanner the scanned or digitized documents including the identified visual feature, information describing the identified visual feature, OCR data, the additional information associated with the barcode, or combinations of these. The digitized documents may be stored in database 530. Database 535 stores security policies. Database 537 stores security policy definitions.

In a specific implementation, a security policy specifies one or more conditions under which access to a digitized document is granted or denied. A policy condition may be based on a user, group, role, or combinations of these. For example, a policy may specify the condition "allow access only if user is the person who signed the document."

A policy condition may be based on a date and time. A policy may specify that access is allowed during a certain time period, access is denied during a certain time period, access is allowed outside of a certain time period, or access is denied outside of a certain time period. For example, a policy may specify "allow access for 48 hours," "allow access before May 23, 2012," or "allow access after May 23, 2012," "block access between 5:00 p.m. and 6:00 a.m." A policy condition may be based on context. Access may be allowed or denied based on the presence of a specified attribute or parameter. For example, access may be granted in cases of emergency and denied in other non-emergency cases. A security policy may specify the type of access, permission, or operation that is allowed. Examples of types of access include open, copy, print, edit, delete, or move.

A security policy definition identifies or defines the user, group, or role specified in the policy condition. For example, a policy may specify the condition "allow access to treating physician." The identities of the treating physician role or group may be stored in security policy definition database 537. For example, database 537 may define the treating physicians to be "Jack Ryan," "David Lee," and "Betty Sachs." Some examples of roles include social worker, intern, nurse, fellow, resident, physician, therapist, student, and others.

Separating or decoupling the security policy definition from the condition allows for a more flexible system. Consider the previous example. If another treating physician needs to have access to the patient's file, an administrator can add the new treating physician to the security policy definition without having to modify the security policy condition. Conversely, if a treating physician needs to be removed from the list of people who have access to the patient's file, the administrator can simply remove or delete the treating physician from the policy definition without having to modify the security policy condition.

In a specific implementation, security policy definitions include constraints or actions, or both that are enforced for a set of "secured resources." The secured resources (e.g., scanned or digitized documents) are identified in the policy using classifications that are derived from the analysis or rules engine 520. Inputs to determine this classification are the feature-extraction, OCR input from the digital image analysis, or both. The constraints are access or action rules that can be evaluated during attempted access. The types of constraints in the policy may be determined by the type of document or media. Some example types include: "role-based," "identity-based," "group-membership-based," "time-based," and so forth. In a specific implementation, these memberships are checked against authentication engine 507, but this is not necessarily always the case.

The above framework allows the security polices to be evaluated dynamically or to be evaluated based on context. For example, a physician (e.g., "Dr. Jack Ryan") may be in the role of an emergency room ("ER") physician on Saturdays from 8 PM-12 AM, in which case he has access to a patient's medical records including records of celebrities (e.g., Lindsay Lohan's records if she is in ER). However, attempted access by the physician outside of this role will be rejected because he will not be a member of an "ER Physician" group at other times.

Security policies may be analogized to concentric circles in that a policy can delegate elements of trust to other systems that radiate outwards towards the end-point or end-user. For example, Dr. Jack Ryan may be able to access Lindsay's records he may not be able to print them for distribution to the news-media. So, a client application may be delegated trust to enforce this restriction by being sent down the policy which contains the rule.

Below is an example of describing such a rule and the way it may be stored in storage 530, 537, or both.
<Document-Classification: Patient_record>: <Role: ER Staff>:<Rights: Read>:<Actions: Audit>
<Document-Classification: Patient_record>: <Role: Family_Doctor>:<Rights: Read, Edit, Print>

Database 540 stores policy assignment rules. A policy assignment rule specifies the conditions for selecting, deciding on, or choosing a particular security policy to assign to the document. Security policy assigner 520 includes an analysis or rules engine 559. The security policy assigner is responsible for assigning or attaching one or more security policies to the document based on the rules engine's evaluation of the policy assignment rules.

Certain documents because of their content may be more or less sensitive than other documents. A policy assignment rule can specify that if a document includes first content then assign a first security policy to the document, otherwise, assign a second security policy to the document, where one of the first or second security policies is more restrictive than another of the first or second security policies.

For example, in a specific embodiment, a digitized document is a medical record. A medical record may include protected health information. Protected health information includes information that relates to the physical or mental health of a patient and information that can be used to identify the patient. Alternatively, the digitized document may be public information such as a marketing brochure, news release, or advertisement. In the former case, a first policy is assigned to the medical record. In the latter case, a second policy is assigned to the marketing brochure, where the first policy is more restrictive than the second policy.

For example, the first policy may restrict or limit who can access the medical record and the conditions under which the record can be accessed. The first policy may specify that the medical record be stored in an encrypted format, that attempts to send the record in an email message (e.g., as an attachment to the email message) should be blocked, specify that accesses to the record be logged (e.g., stamped with a time, date, and the username), specify that digital rights management (DRM) protection be attached to the document, or combinations of these. The second policy may be less restrictive than the first policy. For example, the second policy may permit the marketing brochure to be copied, accessed by anybody, distributed in an unencrypted format outside the organization, or combinations of these.

The rules engine of the policy assigner may evaluate or consider multiple inputs (e.g., two or more inputs) when deciding which security policy to assign to the document that has been digitized. A first input may be the document content. A second input may be the additional information provided by a barcode associated with the document.

In a specific implementation, the inputs for policy assignments depend on the types of documents and the facets of information that can be extracted to be used for classification of the document. As discussed above, documents can structured, semi-structured and unstructured, each of which offers different extractable/recognizable inputs. Structured documents can be forms (e.g., consent forms, reports) out of which one can extract textual field names as well as values. Semi-structured documents are highly diverse. The structure of the document is well-defined using, say, field names or region but the content can be textual or graphical. For example, a semi-structured document may be a hand-written surgery authorization or prescription in which the type of document is identifiable using its standard structure but the text is hand-written by the physician. On the other hand, certain types of CAD drawings or medical images often are mostly graphical images, but contain a small "title block" at the corner that has key identifying information in textual format. In such a case, the input that could form the basis for policy assignment could be either the text in the title block (e.g., "Project: Hadron Collider"), features extracted from the graphics (e.g., "infant-detected-in-womb"), or both.

Upon a security policy being assigned or attached to a scanned document, the document can be stored in database 530 for access according to the assigned policy. Security policy evaluator 525 is responsible for evaluating a document's assigned security policy to determine whether access to the document should be granted or denied. In a specific implementation, the security policy evaluator can detect an attempt by client 510 to access a document having an assigned security policy and stored in database 530. In a specific implementation, detecting the attempt includes receiving a request from the client to access the document. The request may be referred to as a callback. The document may be stored at the central server, the client, or both. For example, there may be a copy of the document at the client. Based on an evaluation of the assigned policy, a user 557 at the client may be permitted or blocked from accessing the document.

Authentication engine 507 is responsible for authenticating users or persons interacting with the system. In a specific implementation, the authentication engine includes a Lightweight Directory Access Protocol ("LDAP") server). The LDAP server provides a directory service that the central server can reference to determine the identity of a user. For example, specific names of "treating physicians" such as "Jack Ryan," and "David Lee" would typically not be a static part of the policy database since identities and roles change. Rather it is built into the policy as "treating physicians" and this role is defined within the identity and authentication engine.

Figure 6:
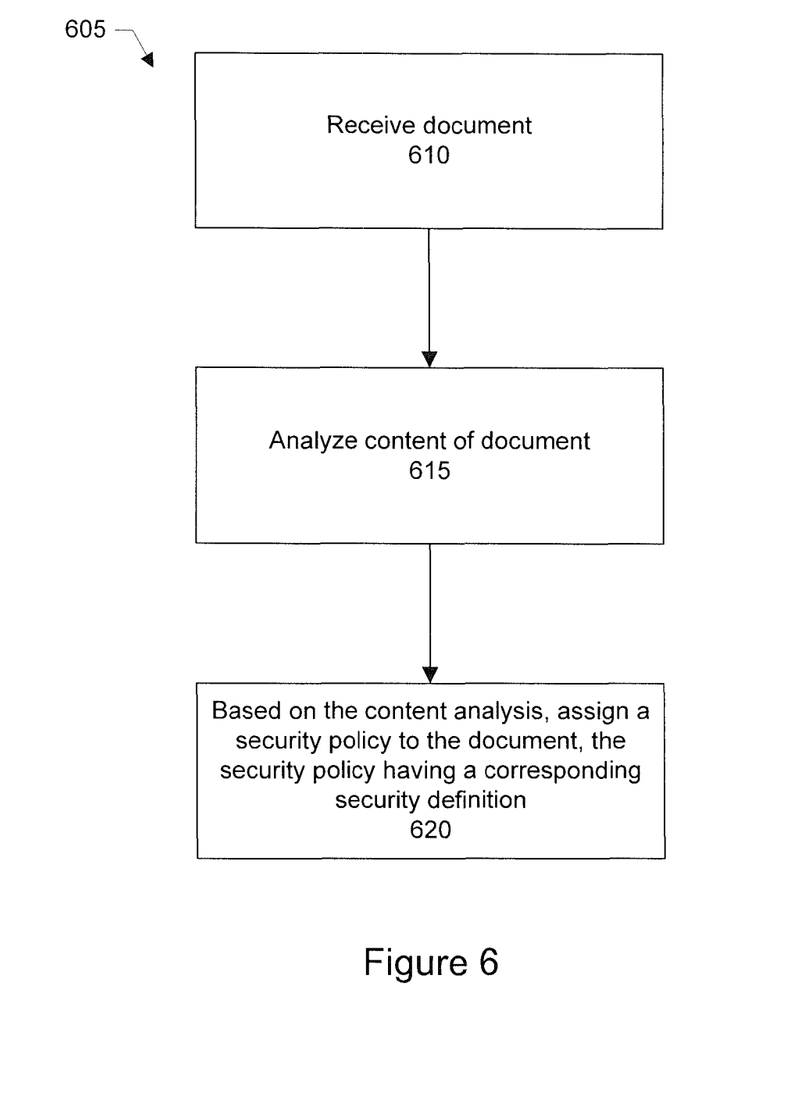
FIG. 6 shows an overall flow for automatically assigning protection to digitized documents.

FIG. 6 shows an overall flow diagram 605 for automating the assignment of a security policy to a document that has been digitized. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 610, a document that has been scanned or digitized is received. In a step 615, the system analyzes the document content. In a step 620, based on the content analysis, the system assigns to the document a security policy having a corresponding policy definition that may be stored separately from the document and security policy.

The information that is received (step 610) may include a scanned document image, OCR data extracted from the document, an indication of whether the extracted OCR data was typewritten or printed text, an indication of whether the extracted OCR data was handwritten text, information associated with a barcode, or combinations of these.

In specific implementation, a content analysis (step 615) for assignment of a security policy (step 620) includes analyzing the scanned document to identify a visual feature in the scanned document. Any competent feature recognition technique may be used including, for example, shape recognition, semantic reasoning, pre-defined feature templates, pattern recognition, facial recognition (e.g., identifying a person in a scanned photograph), or others. The analysis may include scanning or parsing the OCR data of a document to find one or more particular fields or form fields and entries or values corresponding to the fields. In a specific implementation, the particular fields identify names of people. A security policy may be assigned to the document that grants access to users having names that match the people found in the document and blocks access to users having names that do not match the people found in the document. Some examples of fields that the system may attempt to find in the OCR data of a document include "Ordering Physician," "Attending Physician," "Patient," "Examining Physician," "Dictated by," "Signed by," and so forth.

Consider, as an example, FIG. 9 which shows a sample medical record 905. The medical record includes fields 910, 915, and 920. Field 910 is labeled "Name" and includes a corresponding entry or value "Bill Smith." Field 915 is labeled "Ordering Physician" and includes a corresponding entry "Jack Ryan." Field 920 is labeled "Dictated by" and includes a corresponding entry "David Lee."

In a specific implementation, there can be a policy assignment rule that specifies a policy to be assigned such that access is granted to people named in the document. A policy assigned to document 905 may allow access by users having the name "Bill Smith," "Jack Ryan," or "David Lee." Users not having those names may be blocked from accessing the document.

In another specific implementation, access to the document is group or role based. There can be a policy assignment rule that specifies a policy to be assigned such that access is granted to people named in the document and groups which include the people named in the document. Thus, a user not explicitly named or identified in the document may still be able to access the document. This allows, for example, colleagues of "David Lee" to access the document. For example, "David Lee" may be part of a group of radiologists that includes "John Kent." Thus, a policy assigned to document 905 may allow access by a user having the name "John Kent." This can be beneficial in cases where the users explicitly named in the document are not available (e.g., are on vacation), but the document needs to be accessed.

In another specific implementation, a policy is assigned based on whether a person identified in the document belongs to a particular group. For example, a medical record of a celebrity may be assigned a more restrictive policy than a medical record belonging to a non-celebrity. Celebrities may include actors (e.g., movie stars), entertainers, politicians, royal figures, people of interest, and others. The system may assign more restrictive security policies to these medical records because there may be more improper attempts to access such records.

In this specific implementation, the system may maintain two or more groups of patients. A medical record including a name of a patient is received. The system analyzes the medical record to determine whether the patient belongs to a first group or a second group. If the patient belongs to the first group, a first security policy is assigned to the medical record. If the patient belongs to the second group, a second security policy is assigned to the medical record. One of the first or second security policies is more restrictive than another of the first or second security policies.

The more restrictive security policy may limit the frequency at which the medical record can be accessed. For example, the security policy may include a threshold value that limits the number of attempts per hour to access the medical record. The more restrictive security policy may invoke or cause a popup dialog box warning when the medical record is accessed. For example, the dialog box may include a notification stating that accessing the medical record for non-legitimate medical purposes is unlawful. The more restrictive security policy may trigger a notification (e.g., email notification) each time the medical record is accessed. For example, the notification may be sent to the hospital's security administrator or the chief physician in charge of the celebrity patient.

In another specific implementation, a content analysis includes scanning or parsing the OCR data to find one or more predefined keywords. A keyword may be mapped to a particular category which in turn may be mapped to a particular security policy. A stemming algorithm may be used for fuzzy matching between a word found in the OCR data and a predefined keyword.

In a specific implementation, a first category is mapped to a first security policy. The first security policy may specify that the document (e.g., medical health record) to which the first security policy is assigned is not to be transmitted via electronic mail (i.e., email).

In this specific implementation, the first category includes keywords associated with sexually transmitted diseases (STDs), mental health, substance abuse (e.g., alcohol abuse, or drug abuse), and human immunodeficiency virus (HIV) testing. Some examples of specific keywords that may be included in the first category are chancroid, chlamydia, gonorrhea, syphilis, candidiasis, CMV, hepatitis B, HPV, bipolar, dysthymia, schizophrenia, alcohol, cocaine, marijuana, or combinations of these. A keyword may include particular billing code or medical code (e.g., diagnosis code or procedure code). A specific example of a medical classification code includes the International Statistical Classification of Diseases and Related Health Problems (ICD) codes.

In some jurisdictions, health records concerning the diagnosis and treatment of STDs, mental health, and substance abuse require special care to be exercised. For example, state and federal laws may provide penalties for the transmission of such information via email because email may be less secure that other means of transmission. The security policy assigned or attached to such a medical record can help ensure that the organization (e.g., hospital) is in compliance with these legal requirements.

In a specific implementation, a policy includes an exception or override mechanism that allows a document to be accessed in cases of an emergency. The exception may require that the user attempting to access the medical record make an affirmative indication that an emergency situation exists. For example, upon an attempt to access the medical record, the system may display a dialog box prompting a user (who would otherwise be denied access) to indicate whether there is an emergency. If the user confirms there is an emergency situation (e.g., clicking "emergency" checkbox) the system permits the document to be accessed. The emergency access may be allowed temporarily. For example, the emergency access to the medical record may be allowed for 24 hours after which access will be denied.

Emergency override implementations depend on the level of trust that exists within the environment or location of access e.g., "emergency access within a hospital" vs. "emergency access by a hospital in a ski resort to patient's records at his home hospital." In the former, access may be readily granted. In the latter, there may be additional conditions to satisfy before access is given unless, for example, the facility at the ski resort belongs to a trusted partner hospital of the "home hospital." Location of access may be determined by the Internet Protocol ("IP") address of the client machine where the access originated.

In a specific implementation, if trust can not be established based the environment or location, providing "break-glass" access is subject to one or more conditions. One condition may be sharing the document in an encrypted form that is available only to a secure viewer that calls the central server back and checks for various types of access (e.g., print, share, view, and so forth) such that any access is audited. This approach also helps to foreclose the possibility of leakage of the document by electronic distribution. Another means of providing emergency overrides is by the delegation of trust to an exchange or clearinghouse of information in which the owner of the information as well as any possible accessor are members.

Figure 7:
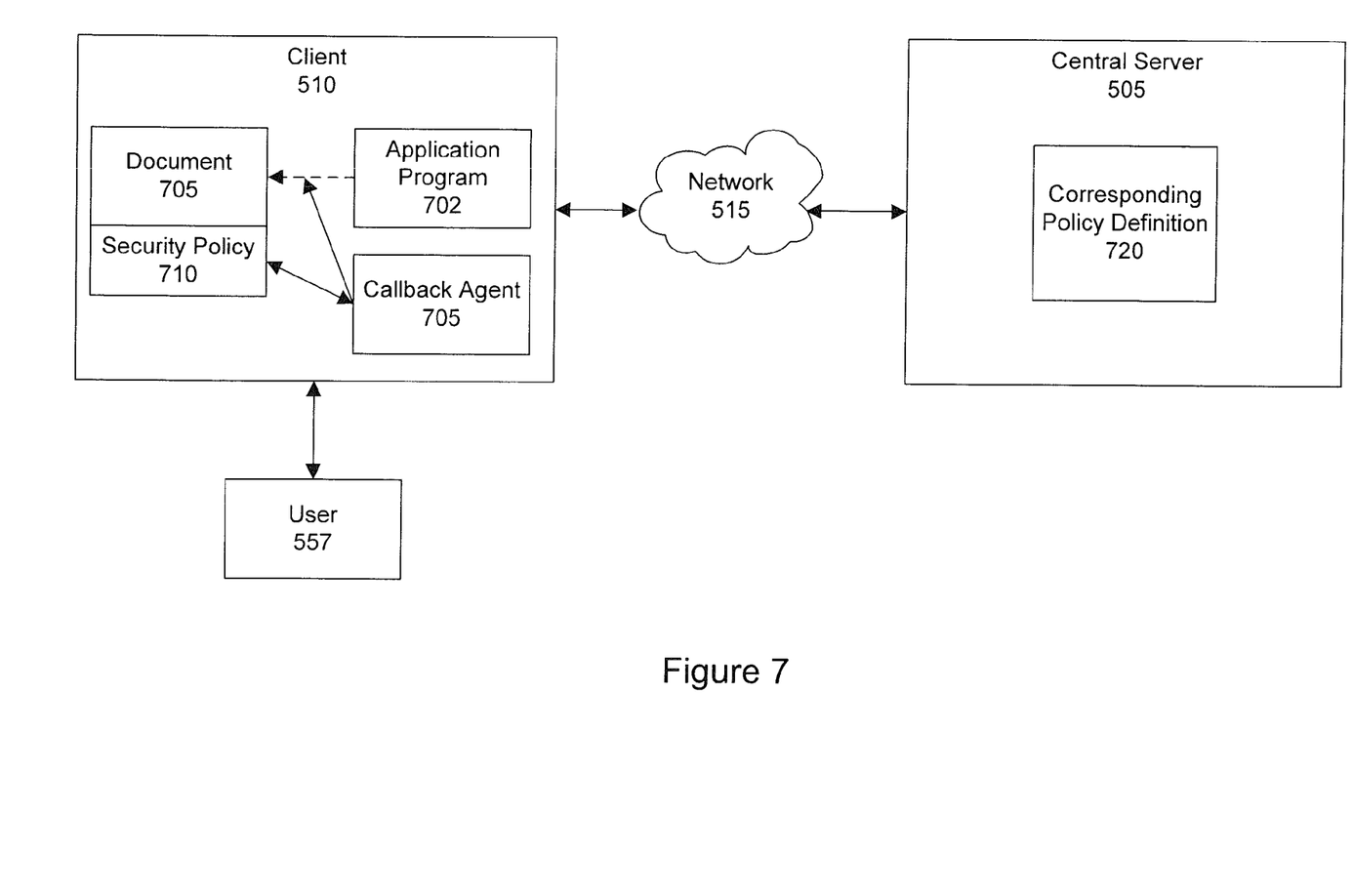
FIG. 7 shows a block diagram of a protected document being accessed.
Figure 8:
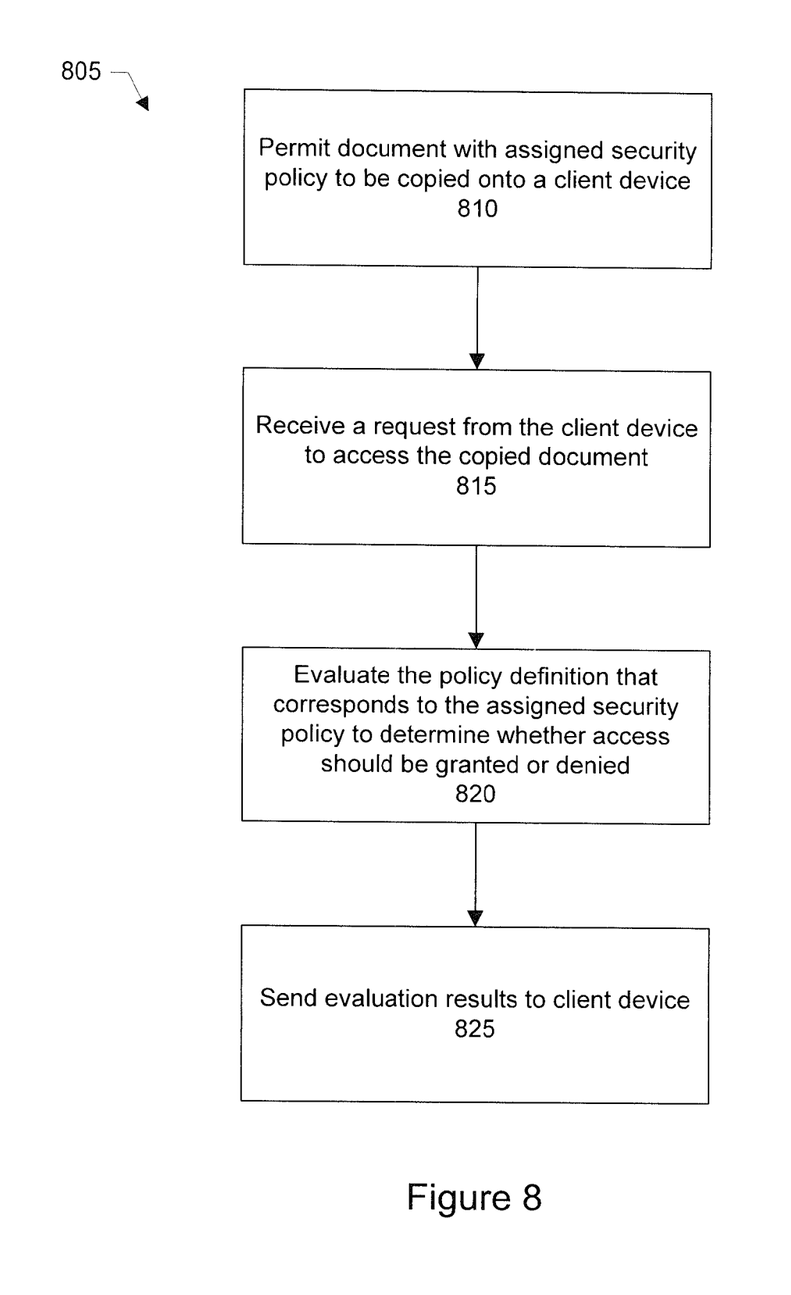
FIG. 8 shows an overall flow for determining whether document access should be granted or denied.

FIG. 7 shows a simplified block diagram for a policy evaluation callback. FIG. 8 shows an overall flow 805 for a callback policy evaluation. Referring now to FIG. 7, client 510 includes an application program 702, a callback agent 705, and a document 710. Document 710 includes an assigned security policy 715. The assigned security policy has a corresponding policy definition 720 stored at central server 505. The document has been copied (e.g., distributed or downloaded) from the central server to client 510.

Application program 702 may be any application program capable of accessing the document. For example, the application may be a viewer program such as Adobe Acrobat Reader, a web browser, an image viewer, and so forth.

The callback agent may be implemented as a separate application program, a code module (e.g., plug-in) that is inserted into application program 702, or a code module that is implemented into an operating system of the client.

In a specific implementation, the callback agent intercepts an attempt from the application program to access the document. For example, the callback agent may detect and intercept an attempt by the application program to open the document. In this specific implementation, the callback agent examines the assigned policy and makes a request or a callback to the central server for evaluation of the corresponding policy definition. The central server notifies the callback agent of the evaluation result. Based on the evaluation result, access to the document is permitted or denied.

In a specific implementation, just as the security policy can be used to restrict access, it can be used as a notification and update mechanism too. For example, the client may call back to the server to request access to a document it possesses. The server may check to see if there has been any update to the document or whether it has gone stale. For example, an emailed design drawing may have been rendered obsolete or corrected and should be updated for access. The policy engine can ensure that it denies access to the old document and indicates to the client how to request the correct version. On the other hand, the callback mechanism can be used to verify the capabilities of client applications to secure the document appropriately. For example, if certain client applications are known to be unable to prevent the printing or screen-copy of information, then the basic callback enables the server to deny access to the entire document.

In a specific implementation, a method includes receiving a request from a client to access a first scanned document stored at the client, the request including a version number of first scanned document, and a title of the first scanned document, retrieving from a document repository a second scanned document having the title of the first scanned document, comparing a version number of the second scanned document with the first number of the first scanned document. The method further includes if the comparison indicates the second scanned document is more current than the first scanned document, blocking access to the first scanned document and transmitting the second scanned document to the client. If the comparison indicates the first and second version numbers are the same, permitting access to the first scanned document. If the comparison indicates the first scanned document is more current that the second scanned document, requesting the client to provide the first scanned document for storage in the document repository. The version number of a more current document may be greater than the version number of a less current document. The version number may be a date such as a date of publication. Alternatively, the version number may be based on other version schemes including, for example, sequence-based identifiers, alphanumeric codes, text, or combinations of these.

In a specific implementation, a method includes receiving a request from a client to access a scanned document stored at the client, the request including a list of software applications installed at the client that are capable of opening the scanned document, determining whether each software application in the list of software applications is capable of enforcing a set of permission restrictions on the scanned document. If each software application is capable of enforcing each permission restriction in the set of permission restrictions, permitting access to the scanned document, and if at least one software application is not capable of enforcing each permission restriction in the set of permission restrictions, blocking access to the scanned document.

More particularly, in a step 810 (FIG. 8), the system permits a document having an assigned security policy to be copied onto a client device. The client device may include, for example, a workstation, laptop, USB stick, portable storage device, smartphone, tablet computer, or other portable or non-portable electronic device.

In a step 815, a request is received from the client device to access the copied document having the assigned security policy. In a specific implementation, the received request is in response to callback agent 705 detecting and intercepting an attempt at the client to access document 705. The callback agent generates a request that is transmitted to the central server. The request may include for example, a name of a user 725 at the client, and an identifier for assigned security policy 710.

In a step 820, the system evaluates, at the central server, a policy definition that corresponds to assigned security policy 710 to determine whether access to document 705 at the client should be granted or denied. The corresponding policy definition to evaluate can be identified through the identifier for assigned security policy 710. In a step 825, evaluation results are transmitted from the central server to the client device.

This callback technique allows for dynamic policy evaluation. That is, to dynamically change how a policy is enforced. As an example, assigned security policy 710 may specify that doctors living in the same neighborhood (e.g., zip code) of a patient are not permitted to access the patient's medical records. One reason for this restriction is because some of the doctors may know or encounter the patient through social contexts. The patient may desire that their medical records be kept confidential from people with whom the patient has social interactions.

For example, the patient and the doctor may be golfing partners or belong to the same country club. The doctor may be tempted for non-medical reasons such as personal curiosity to examine the patient's medical history. A new doctor may move into the same neighborhood as the patient. The new doctor can be added to the corresponding policy definition so that the new doctor is similarly blocked from accessing the patient's medical records. Thus, although the new doctor may have been able to access the patient's medical records before moving into the neighborhood, the new doctor will now be blocked as a result of having been added to the corresponding policy definition.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   storing at a central server a plurality of scanned documents, and a plurality of security policies, each security policy having a corresponding policy definition;
   analyzing a scanned document to identify a visual feature in the scanned document, wherein the analyzing comprises parsing optical character recognition (OCR) data extracted from the scanned document to identify a form field and an handwritten entry of a name of a person for the form field in the scanned document, wherein the visual feature comprises the form field and the handwritten entry for the form field;
   selecting, based on the identified visual feature, a security policy of the plurality of security policies;
   assigning the selected security policy to the scanned document;
   detecting an attempt to access the scanned document having the assigned security policy;

determining whether a user attempting to access the scanned document has a name that matches the name of the person;

evaluating at the central server the policy definition corresponding to the assigned security policy to determine whether the access is granted or denied; and determining that access should be granted when the user has a name that matches the name of the person and that access should be denied when the user has a name that does not match the name of the person.

2. The method of claim 1 wherein the scanned document comprises a medical image and the visual feature comprises an abnormality.

3. The method of claim 1 wherein the method comprises:

parsing the OCR data to identify an address field and an entry for the address field in the scanned document, wherein the entry for the address field is used to identify a person listed in a directory;

determining whether the user attempting to access the scanned document has an address that matches the entry for the address field; and determining that access should be granted when the user has an address that matches the entry for the address field and that access should be denied when the user has an address that does not match the entry for the address field.

4. The method of claim 1 wherein the handwritten entry for the form field comprises a name of a person and the method comprises:

determining whether the person belongs to a first group or a second group; and assigning a first security policy to the scanned document when the person belongs to the first group, the first security policy being the assigned security policy, or a second security policy to the scanned document when the person belongs to the second group, the second security policy being the assigned security policy, wherein one of the first or second security policies is more restrictive than another of the first or second security policies.

5. The method of claim 1 wherein the plurality of scanned documents are medical records, the scanned document thereby being a medical record of a patient, and the method comprises:

determining whether an entry in the medical record comprises information indicating the patient suffers at least one of a sexually transmitted disease (STD), human immunodeficiency virus (HIV), mental illness, alcohol abuse, or drug abuse;

if the medical record comprises the information, assigning a first security policy to the medical record, the first security policy being the assigned security policy; and if the medical record does not comprise the information, assigning a second security policy to the medical record, the second security policy being the assigned security policy, wherein the first security policy blocks the medical record from being distributed through electronic mail, and the second security policy permits the medical record to be distributed through electronic mail.

6. The method of claim 1 comprising:

encrypting the scanned document; and copying the encrypted scanned document to a client, wherein the client is remote from the central server, and the detecting an attempt to access the scanned document comprises receiving a request from the client to open the encrypted document at the client.

7. A computer program product, comprising a non-transitory computer-readable medium having a computer-readable program code embodied therein, the computer-readable program code including instructions to be executed by one or more processors to:

store at a central server a plurality of scanned documents, and a plurality of security policies, each security policy having a corresponding policy definition;

analyze a scanned document to identify a visual feature in the scanned document, wherein the analyzing comprises parsing optical character recognition (OCR) data extracted from the scanned document to identify a form field and an handwritten entry of a name of a person for the form field in the scanned document, wherein the visual feature comprises the form field and the handwritten entry for the form field;

select, based on the identified visual feature, a security policy of the plurality of security policies;

assign the selected security policy to the scanned document;

detect an attempt to access the scanned document having the assigned security policy;

determine whether a user attempting to access the scanned document has a name that matches the name of the person;

evaluate at the central server the policy definition corresponding to the assigned security policy to determine whether the access is granted or denied; and determine that access should be granted when the user has a name that matches the name of the person and that access should be denied when the user has a name that does not match the name of the person.

8. The computer program product of claim 7 wherein the scanned document comprises a medical image and the visual feature comprises a foreign object.

9. The computer program product of claim 7 wherein further comprising instructions to:

parse the OCR data to identify an address field and an entry for the address field in the scanned document, wherein the name of the person and the entry for the address field are used to identify a person listed in a directory;

determine whether the user attempting to access the scanned document has an address that matches the entry for the address field; and determine that access should be granted when the user has an address that matches the entry for the address field and that access should be denied when the user has an address that does not match the entry for the address field.

10. The computer program product of claim 7 wherein the handwritten entry for the form field comprises a name of a person, further comprising instructions to:

determine whether the person belongs to a first group or a second group; and assign a first security policy to the scanned document when the person belongs to the first group, the first security policy being the assigned security policy, or a second security policy to the scanned document when the person belongs to the second group, the second security policy being the assigned security policy, wherein one of the first or second security policies is more restrictive than another of the first or second security policies.

11. The computer program product of claim 7 wherein the plurality of scanned documents are medical records, the scanned document thereby being a medical record of a patient, further comprising:

determining whether an entry in the medical record comprises information indicating the patient suffers at least one of a sexually transmitted disease (STD), human immunodeficiency virus (HIV), mental illness, alcohol abuse, or drug abuse;

if the medical record comprises the information, assigning a first security policy to the medical record, the first security policy being the assigned security policy; and if the medical record does not comprise the information, assigning a second security policy to the medical record, the second security policy being the assigned security policy, wherein the first security policy blocks the medical record from being distributed through electronic mail, and the second security policy permits the medical record to be distributed through electronic mail.

12. The computer program product of claim 7, further comprising:

encrypting the scanned document; and copying the encrypted scanned document to a client, wherein the client is remote from the central server, and the detecting an attempt to access the scanned document comprises receiving a request from the client to open the encrypted scanned document at the client.

13. A system for automatically assigning a security policy to a document, the system comprising:

a processor-based database management system, which when executed on a computer system, will cause the processor to:

store at a central server a plurality of scanned documents, and a plurality of security policies, each security policy having a corresponding policy definition;

analyze a scanned document to identify a visual feature in the scanned document, wherein the analyzing comprises parsing optical character recognition (OCR) data extracted from the scanned document to identify a form field and an handwritten entry of a name of a person for the form field in the scanned document, wherein the visual feature comprises the form field and the handwritten entry for the form field;

select, based on the identified visual feature, a security policy of the plurality of security policies;

assign the selected security policy to the scanned document;

detect an attempt to access the scanned document having the assigned security policy;

determine whether a user attempting to access the scanned document has a name that matches the name of the person;

evaluate at the central server the policy definition corresponding to the assigned security policy to determine whether the access is granted or denied; and determine that access should be granted when the user has a name that matches the name of the person and that access should be denied when the user has a name that does not match the name of the person.

14. The system of claim 13 wherein the scanned document comprises a medical image and the visual feature comprises an abnormality.

15. The system of claim 13 wherein the handwritten entry for the form field comprises a name of a person and the processor-based database management system when executed on a computer system, will further cause the processor to:

determine whether the person belongs to a first group or a second group; and assign a first security policy to the scanned document when the person belongs to the first group, the first security policy being the assigned security policy, or a second security policy to the scanned document when the person belongs to the second group, the second security policy being the assigned security policy, wherein one of the first or second security policies is more restrictive than another of the first or second security policies.

* * * * *